(12) United States Patent
Kim et al.

(10) Patent No.: US 7,274,948 B2
(45) Date of Patent: Sep. 25, 2007

(54) MOBILE COMMUNICATION TERMINAL HAVING DETACHABLE WIRELESS DISPLAY WINDOW, AND OPERATION METHOD THEREOF

(75) Inventors: Hyung-Jin Kim, Daegu (KR); Jung-Woo Won, Seoul (KR); Jin-Woo Kim, Gumi-si (KR); Jeong-Hoon Kim, Busan (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 143 days.

(21) Appl. No.: 11/177,295

(22) Filed: Jul. 11, 2005

(65) Prior Publication Data

US 2006/0099995 A1 May 11, 2006

(30) Foreign Application Priority Data

Nov. 11, 2004 (KR) ............... 10-2004-0091940

(51) Int. Cl.
*H04M 1/00* (2006.01)

(52) U.S. Cl. .............. 455/550.1; 455/414.1; 455/418; 455/419; 455/420; 455/41.2; 455/41.3; 455/66.1; 455/74; 455/556.1; 455/557; 455/566; 455/569.1; 455/575.1; 455/346

(58) Field of Classification Search .......... 455/41.2, 455/41.3, 66.1, 74, 414.1, 418, 419, 420, 455/550.1, 556.1, 557, 569.1, 575.1, 344
See application file for complete search history.

(56) References Cited

U.S. PATENT DOCUMENTS

| 6,421,232 | B2* | 7/2002 | Sallam | 361/681 |
| 6,757,551 | B2* | 6/2004 | Newman et al. | 455/556.1 |
| 2002/0140690 | A1* | 10/2002 | Gamsaragan et al. | 345/211 |
| 2002/0155864 | A1* | 10/2002 | Wang | 455/566 |
| 2003/0071791 | A1* | 4/2003 | Hanson et al. | 345/169 |
| 2003/0160767 | A1* | 8/2003 | Wong et al. | 345/169 |
| 2003/0198008 | A1* | 10/2003 | Leapman et al. | 361/681 |
| 2004/0162028 | A1* | 8/2004 | Glover | 455/41.2 |
| 2006/0061948 | A1* | 3/2006 | Yin | 361/683 |

FOREIGN PATENT DOCUMENTS

| JP | 08-181744 | * 7/1996 |
| JP | 2003-209603 | * 7/2003 |

* cited by examiner

*Primary Examiner*—Steve M. D'Agosta
(74) *Attorney, Agent, or Firm*—Roylance, Abrams, Berdo & Goodman, LLP

(57) ABSTRACT

A mobile communication terminal and an operation method thereof are provided. The terminal includes: a detachable display window detached from a main body, for performing short-range wireless communication with the main body; and the main body for performing the short-range wireless communication with the detachable display window, wherein the detachable display window has a liquid crystal display (LCD) wireless communicating unit for providing a wireless communication depending on a short-range wireless communication protocol, and a LCD for displaying the predetermined image.

10 Claims, 5 Drawing Sheets

MOBILE COMMUNICATION TERMINAL HAVING DETACHABLE WIRELESS DISPLAY WINDOW, AND OPERATION METHOD THEREOF

PRIORITY

This application claims the benefit under 35 U.S.C. § 119(a) of Korean Patent Application entitled "Mobile Communication Terminal Having Detachable Wireless Display Window, and Operation Method Thereof" filed in the Korean Intellectual Property Office on Nov. 11, 2004 and assigned Serial No. 2004-91940, the entire contents of which are hereby incorporated by reference.

BACKGROUND OF THE INVENTION

1. Field of the Invention

The present invention relates generally to a mobile communication terminal and an operation method thereof in which a liquid crystal display (LCD) window is detachable from a main body, allowing short-range wireless communication. More particularly, the present invention relates to a mobile communication terminal and an operation method thereof in which a LCD window is detachable from a main body, allowing a video call and the like.

2. Description of the Related Art

Due to functional advances in mobile communication terminals, new functions, such as a camera function and a multimedia playback function, are provided in addition to a wireless communication function. This multimedia function is being gradually and popularly used with improvements of a display window of the mobile communication terminal and realization of high-speed communication. The multimedia function is already being commercially used, and the mobile communication terminal will be used as an all purpose portable entertainment system. Among multimedia functions, the camera function and the multimedia playback function are the most popular functions. Accordingly, a user can view not only video-on-demand (VOD), but also digital multimedia broadcasting (DMB) by using a DMB phone. Further, the user can enjoy not only a voice call, but also a video call due to improvements in data transfer rates in an International Mobile Telecommunications-2000 (IMT-2000) system and the like.

The mobile communication terminal is classified as a bar-type terminal, a flip-type or folder-type terminal according to its appearance. In general, the mobile communication terminal comprises a microphone and a speaker for voice communication, and a keypad or a touch-sensitive panel for data input. Specifically, the mobile communication terminal uses a display window, for example, such as a liquid crystal display (LCD) to display an output of input data. However, the conventional mobile communication terminal is limited in its efficiency when using various multimedia functions. In other words, the conventional mobile communication terminal has a drawback in that since the LCD is mounted on a main body, the LCD cannot be effectively used for video calls, for example.

SUMMARY OF THE INVENTION

It is, therefore, an object of the present invention to provide a solution for a mobile communication terminal in which a liquid crystal display (LCD) window is detachable from a main body, allowing a user to exchange video data in short-range wireless communication.

It is another object of the present invention to provide a solution for a mobile communication terminal in which an algorithm for performing short-range wireless communication is provided to allow a user to enjoy a video call and the like through a detachable LCD window.

To achieve the above and other objects, a mobile communication terminal for displaying an image is provided. The terminal comprises a detachable display window detachable from a main body for performing short-range wireless communication with the main body, and the main body for performing the short-range wireless communication with the display window, wherein the detachable display window has a liquid crystal display (LCD) wireless communicating unit for providing wireless communication based on a short-range wireless communication protocol, and a LCD for displaying the predetermined image.

In another aspect of the present invention, a method for operating a mobile communication terminal comprising a detachable display window is provided. The method comprises the steps of, displaying a call request upon receiving a video call packet, and entering a video call mode using short-range wireless communication when it is detected that the detachable display window is detached, and entering a video call mode when a send key is pressed.

BRIEF DESCRIPTION OF THE DRAWINGS

The above and other objects, features and advantages of the present invention will become more apparent from the following detailed description when taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

Exemplary embodiments of the present invention will now be described in detail with reference to the accompanying drawings. In the following description, a detailed description of known functions and configurations incorporated herein has been omitted for clarity and conciseness.

Figure 1:
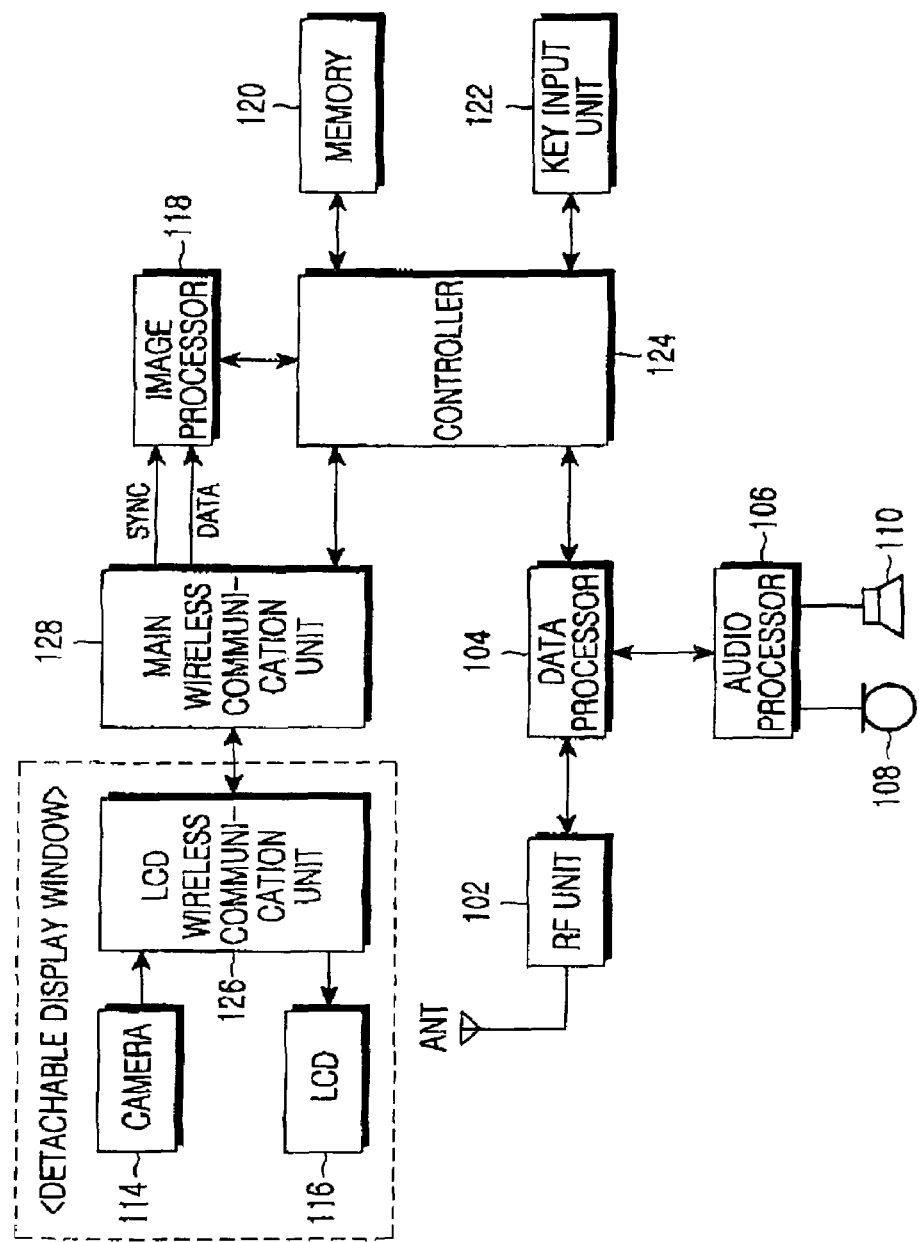
FIG. 1 is a block diagram illustrating a mobile communication terminal comprising a detachable display window according to an exemplary embodiment of the present invention.

FIG. 1 is a block diagram illustrating a mobile communication terminal comprising a detachable display window according to an exemplary embodiment of the present invention.

Referring to FIG. 1, a radio frequency (RF) unit 102 performs a wireless communication function of the mobile communication terminal. The RF unit 102 comprises a RF transmitter (not shown) for up-converting a frequency of a transmission signal and amplifying the up-converted transmission signal, and a RF receiver (not shown) for low-noise amplifying a reception signal and down-converting a frequency of the amplified reception signal. A data processor 104 comprises a transmitter (not shown) for encoding and modulating the transmission signal, and a receiver (not shown) for demodulating and decoding the reception signal. That is, the data processor 104 may comprise a modulator/demodulator (modem) and a coder/decoder (codec). The codec comprises a data codec (not shown) and an audio codec (not shown). The data codec processes packet data and the like, and the audio codec processes an audio signal such as voice.

The audio processor 106 reproduces a reception audio signal, which is output from the audio codec of the data processor 104, through a speaker 110. The audio processor 106 transmits a transmission audio signal, which is generated from a microphone 108, to the audio codec of the data processor 104. Specifically, the speaker 108 comprises an ear speaker/handset speaker and a high-power speaker. A use and function of the ear speaker and the high-power speaker will be described later in detail with reference to FIG. 2.

A memory 120 comprises a program memory (not shown) and a data memory (not shown). The program memory stores a booting program and an operating system (OS) for controlling an overall operation of the mobile communication terminal. The data memory stores a variety of data generated during the operation of the mobile communication terminal.

A key input unit 122 comprises alphanumeric keys for inputting numeric and character information, and function keys for setting a variety of functions.

The controller 124 controls the overall operation of the mobile communication terminal. The controller 124 enables/disables the speaker 110 depending on whether the detachable display window 210 is detached or not.

An image processor 118 generates image data for displaying an image signal output from a camera 114. The image processor 118 processes the image signal from the camera 114 on a frame-by-frame basis, and outputs the image data adaptively to a feature or a size of a liquid crystal display (LCD) 116. The image processor 118 comprises a video codec. The image processor 118 compresses the image data displayed on the LCD 116 and/or decompresses the compressed image data into original image data by using a predetermined image compression technique. The video codec can be a selected one of a Joint Photographic Experts Group (JPEG) codec, a Motion Picture Experts Group-4 (MPEG4) codec, a Wavelet codec, and the like.

A main wireless communicating unit 128, which is a short-range wireless communication interface exchanging wireless data with the detachable display window 210, is mounted on a main body having a keypad. The controller 124 can transmit a variety of image data to a LCD wireless communication unit 126, which is installed in the detachable display window 210, through the main wireless communicating unit 128. The controller 124 can receive the image data from the camera 114 in the detachable display window 210, using the LCD wireless communication unit 126. As a typical short-range wireless communication technique, various conventional short-range communication techniques based on a Bluetooth protocol and an infrared data association (IrDA) protocol are popularly used. As the short-range wireless communication technique uses an algorithm and frequency band based on the conventional protocols, a detailed description thereof will be omitted.

Figure 2:
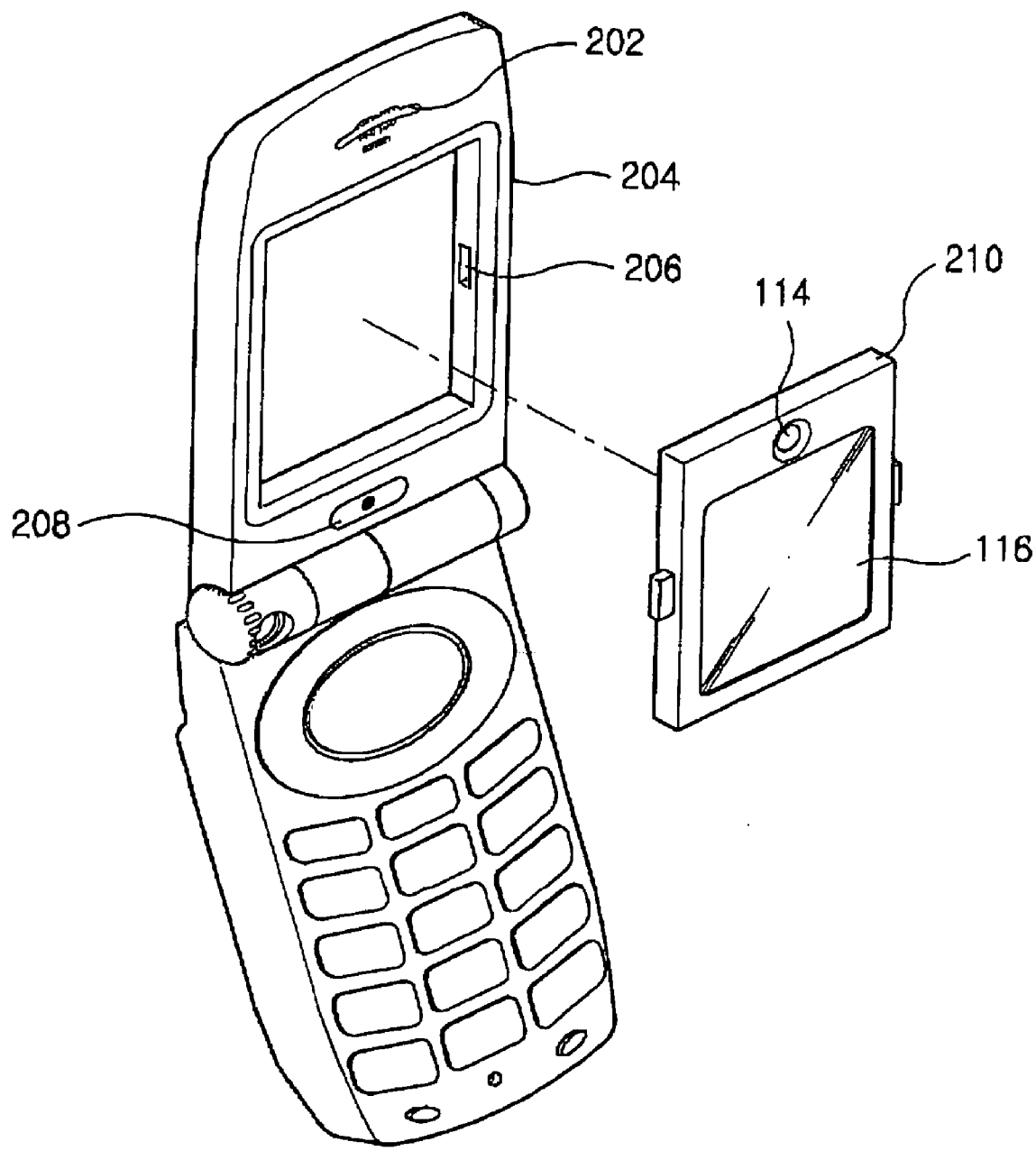
FIG. 2 is an exterior perspective view illustrating a mobile communication terminal comprising a detachable display window according to an exemplary embodiment of the present invention.

The detachable display window 210 is fully detachable from the mobile communication terminal. The detachable display window 210 comprises a camera 114, a LCD 116, and a LCD wireless communication unit 126. The detachable display window 210 is shown in FIG. 2 in appearance according to an exemplary embodiment of the present invention.

As the present invention does not relate to a mechanical structure of the mobile communication terminal comprising the detachable display window 210, its detailed description will be omitted for clarity and conciseness. Only an exterior shape of the mobile communication terminal, which is required for a description of an exemplary embodiment of the present invention, will be described in detail.

In the mobile communication terminal, the detachable display window 210 can be press-fittingly attached to or detached from an upper folder 204 of the mobile communication terminal. The detachable display window 210 can transmit and receive data through a fragment connection pin 206 when being fittingly attached to the upper folder 204 of the mobile communication terminal. The detachable display window 210 can transmit and receive data through short-range wireless communication when being detached from the upper folder 204. In the mechanical structure where the detachable display window 210 is detached from the main body, various methods can be employed other than the method of FIG. 2. In one method, only a LCD window can be detached from the upper folder 204 as shown in FIG. 2. In another way, a hinge of the mobile communication terminal can be removed, thereby separating the whole upper folder 204 from the main body. Accordingly, as for the separation method, various mechanical structures can be employed. However, as an object of the present invention is not to limit the mechanical structure for separating the detachable display window, a detailed description thereof will be omitted.

The LCD wireless communication unit 126 is a short-range wireless communication interface for wirelessly exchanging data with the main wireless communicating unit 128, which is provided to the main body of the mobile communication terminal. The LCD wireless communication unit 126 performs the short-range wireless communication, such as Bluetooth communication, with the main wireless communication unit 128. The camera 114 is a camera sensor for photographing and obtaining the image data, and converting an obtained optical signal into an electrical signal. After photographing an image, the camera sensor transmits the photographed image to the image processor 118 through the LCD wireless communication unit 126 and the main wireless communication unit 128. The LCD 116 displays the image signal output from the image processor 118 and user data output from the controller 124, on its screen.

The detachable display window 210 exchanges data with the main body of the mobile communication terminal through the fragment connection pin 206 when being attached to the mobile communication terminal. The display window 210 exchanges data through the short-range wireless communication, such as Bluetooth communication, the IrDA and the like, when being detached from the mobile communication terminal.

Figure 3:
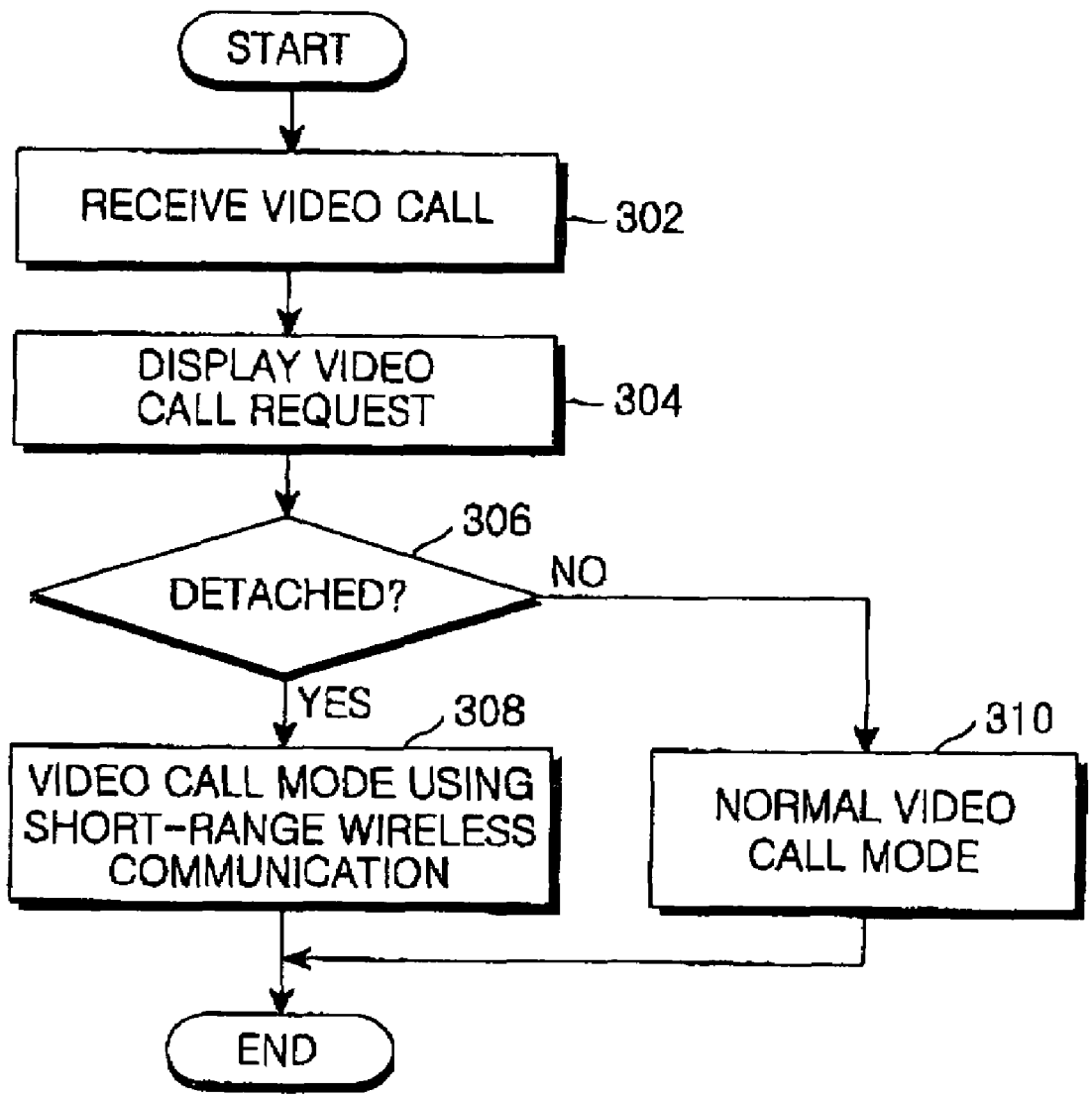
FIG. 3 is a flowchart illustrating a video call processing method of a mobile communication terminal according to an exemplary embodiment of the present invention.

FIG. 3 is a flowchart illustrating a video call processing method using the detachable display window according to an exemplary embodiment of the present invention.

When the mobile communication terminal receives a call packet through a wireless network at step 302, the controller 124 displays the reception of the call packet on the detachable display window 210 at step 304. In other words, when the mobile communication terminal receives a video-call packet, the controller 124 displays on the detachable display window 210 that a video call is requested. When a user views the requested video call on the display window 210 and detaches the display window 210 from the main body, the controller 124 detects the detachment of the detachable display window 210 at step 306 and enters a video call mode using the short-range wireless communication at step 308. The fragment connection pin 206 is used to determine whether or not the detachable display window 210 is attached to or detached from the main body. Even in the case where the mobile communication terminal employs other separation methods such as a hinge separation method other than a display window separation method of FIG. 2, the fragment connection pin 206 is placed in a corresponding structure position to detect attachment or detachment. In the video call mode at step 308 using the short-range wireless communication, the LCD wireless communicating unit 126 and the main wireless communicating unit 128 are driven, thereby allowing the image processor 118 to communicate data with the detachable display window 210 by using the short-range wireless communication units. As a result, the user can perform the video call with the remotely placed LCD window by separating the detachable display window 210.

After that, when the user pushes a specific key on a keypad and accepts a video call request without separating the detachable display window 210, the controller 124 performs a video call mode without driving the LCD wireless communication unit 126 and the main wireless communication unit 128 at step 310. As described above, in the mobile communication terminal, the detachable display window 210 comprising the LCD is detachable from the main body, enabling the wireless communication. As a result, as shown in FIG. 3, the user can enjoy the video call, a video-on-demand (VOD) streaming appreciation and the like through the LCD of the detached display window 210 detached from the main body if needed.

When the user enjoys the video call with the detachable display window 210 detached from the main body, the mobile communication terminal should recognize a remotely placed user's voice and provide a high-power voice to other users. For this, the microphone and the speaker should be controlled. This control process according to an exemplary embodiment of the present invention will be described with reference to FIG. 4.

Figure 4:
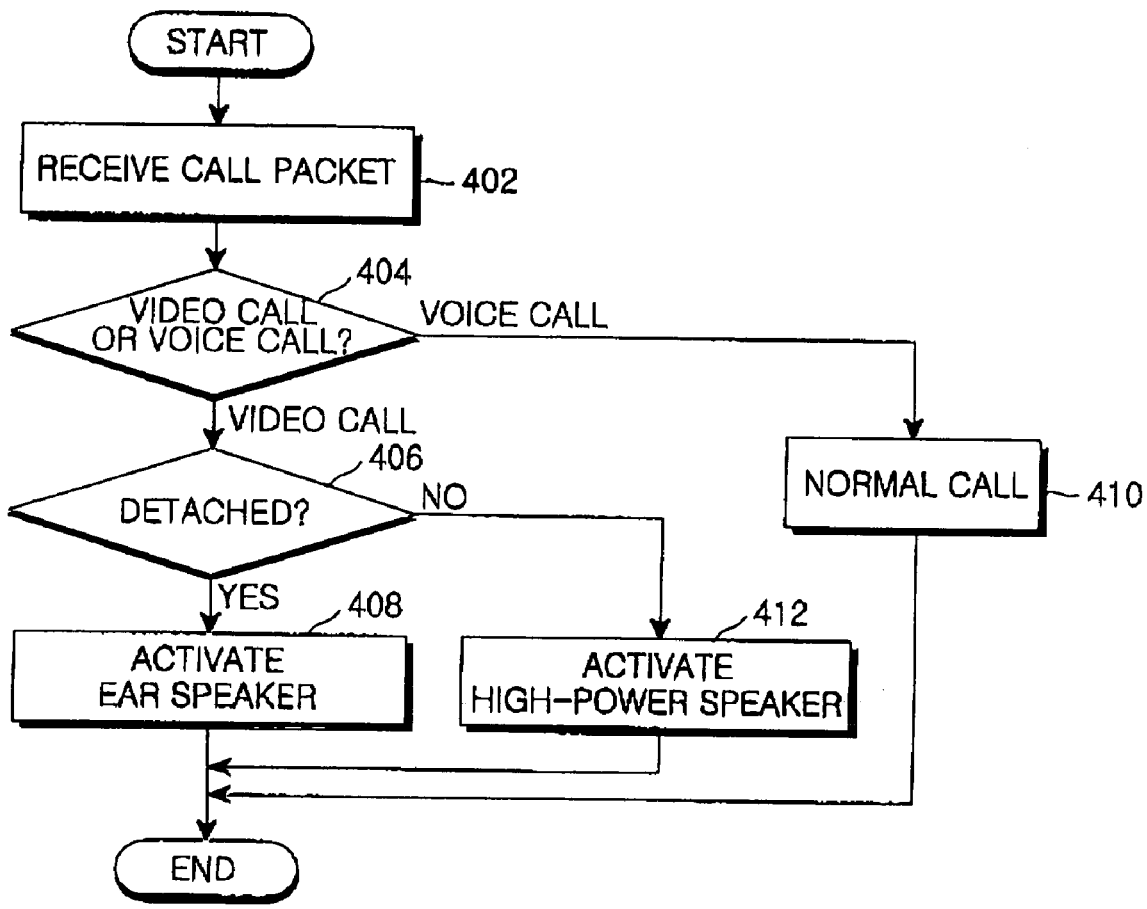
FIG. 4 is a flowchart illustrating a method of controlling an operation of an earphone and a microphone according to an exemplary embodiment of the present invention.

FIG. 4 is a flowchart illustrating an operation method of the mobile communication terminal depending on whether or not the detachable display window is detached according to an exemplary embodiment of the present invention.

If the mobile communication terminal receives a call packet from a base station at step 402, the mobile communication terminal analyzes a header of the received call packet and determines whether a requested call is a video call or a voice call at step 404. As a result, if it is determined that the requested call is the voice call, the mobile communication terminal enters a voice call mode at step 410. If it is determined that the requested call is the video call, it is determined whether or not the detachable display window 210 is detached at step 406. The determination at step 406 is performed by using a signal from the fragment connection pin 206, which functions as a reference for determining whether or not the detachable display window 210 is detached from the main body. As a result, if it is determined that the detachable display window. 210 is attached, the high-power speaker is activated at step 412, otherwise, the high-power speaker is inactivated and the ear speaker of the main body is activated at step 408 to perform the video call. Accordingly, when the user detaches the detachable display window 210 from the mobile communication terminal, a video signal can be displayed through the detached detachable display window 210 and a voice call can be performed through the upper folder 204 held to his/her ear, thereby allowing the video call. As a result, in the mobile communication terminal, the ear speaker being a low-power speaker can be used, without a need of the high-power speaker, to perform the video call.

As a result, in the mobile communication terminal comprising the detachable display window 210, as shown in FIG. 2, the ear speaker 202 and the high-power speaker 208 are provided to perform the video call according to FIG. 4. The ear speaker 202 generates a low-power analog voice to allow a user's call by using the upper folder 204 held to his/her ear. The high-power speaker 208 generates a high-power analog voice to allow the user to recognize the other party's voice without the upper folder 204 held to his/her ear. Accordingly, when the detachable display window 210 is detached, thereby allowing the user to view the video on the LCD 116 of the detached detachable display window 210 while being served by the voice call through the upper folder 204 held to his/her ear to perform the video call, the ear speaker 202 is operated to generate the low-power voice. In contrast, when the user uses the video call with the detachable display window 210 attached to the main body, the high-power speaker 208 is enabled.

In a conventional mobile communication terminal, an image can be displayed on its built-in liquid crystal display. However, actually, the conventional mobile communication terminal cannot have a built-in liquid crystal display larger than a predetermined size due to its portability, manufacturing cost, consumption power and the like. Accordingly, there is a drawback in that due to the limitation of a small-sized liquid crystal display, the mobile communication terminal is not used for digital multimedia broadcasting (DMB) and the video call within a home where the user is not in motion, and is simply used only for the voice call. In order to solve the above drawback, a plurality of applications relating to a wireless liquid crystal display have been filed and for example, there is Korean Patent Application No. 10-2000-040086 entitled "WIRELESS LIQUID CRYSTAL DISPLAY" disclosing main units, that is, a terminal processor and a liquid crystal display, which is incorporated by reference. The terminal processor and the liquid crystal display (LCD) are separated from each other to perform short-range wireless communication (RF communication), thereby displaying an image on the large-sized wireless liquid crystal display. A video call processing method by using the wireless liquid crystal display in place of the detachable display window 210 in the mobile communication terminal comprising the detachable display window 210 will be described with reference to FIG. 5.

Figure 5:
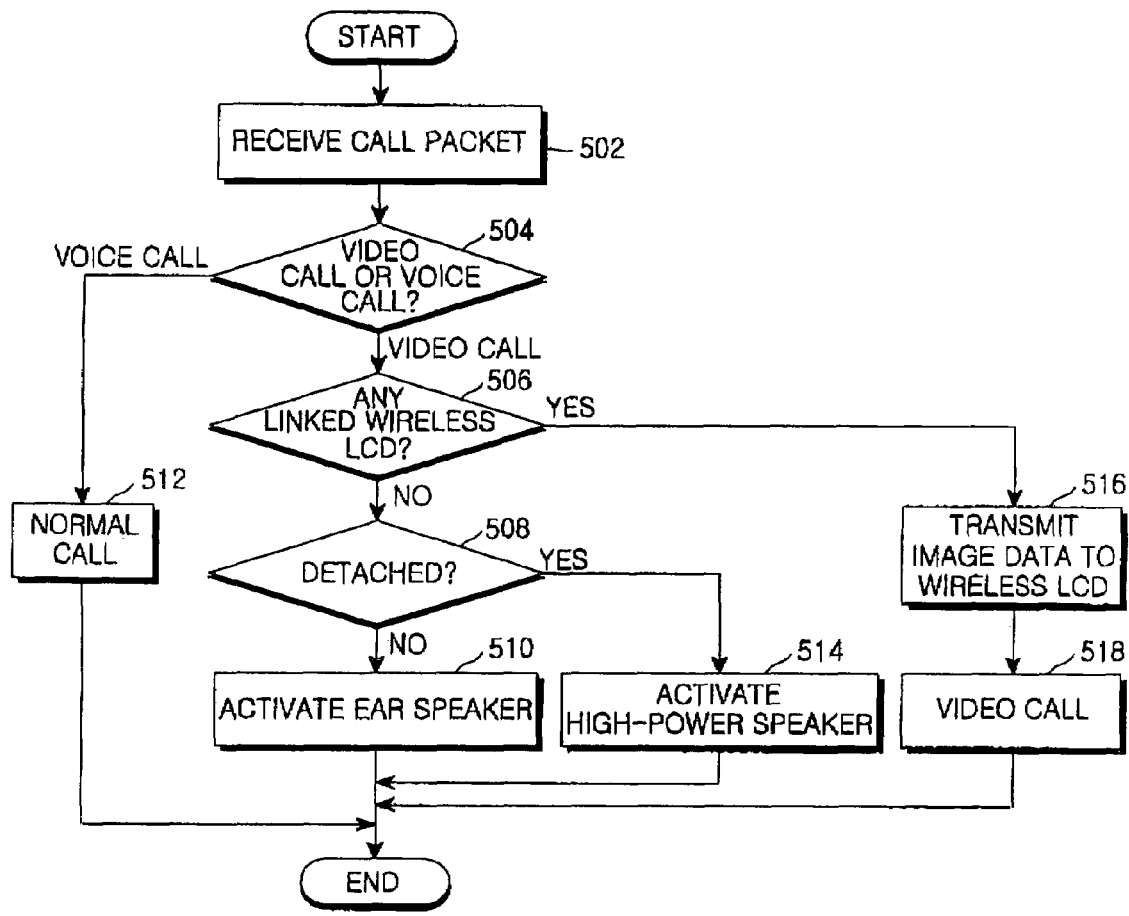
FIG. 5 is a flowchart illustrating a video call processing method which uses a separate wireless liquid crystal display according to another exemplary embodiment of the present invention.

FIG. 5 is a flowchart illustrating a video call processing method by using the mobile communication terminal, which is provided with the detachable display window and linked to the wireless liquid crystal display, according to another exemplary embodiment of the present invention.

If the mobile communication terminal receives a call packet from a base station at step 502, the mobile communication terminal analyzes a header of the received call packet and determines whether the received call is a video call or a voice call at step 504. As a result, if it is determined that the received call is the voice call, the mobile communication terminal enters a voice call mode at step 512. If it is determined that the received call is the video call, it is determined whether the separate wireless liquid crystal display is linked with the mobile communication terminal at step 506. The wireless liquid crystal display can employ a large-sized LCD, a TV cathode ray tube, a monitor and the like. It is determined whether the mobile communication terminal is linked to the wireless communication with the wireless liquid crystal display. As a result, if it is determined that the mobile communication terminal is wireless-linked with the separate wireless liquid crystal display, the mobile communication terminal transmits the image data to the corresponding wireless liquid crystal display at step 516 to perform the video call at step 518. If it is determined that the mobile communication terminal is not linked with the separate wireless liquid crystal display, the mobile communication terminal uses its detachable display window 210 to perform the video call. That is, it is determined whether the detachable display window 210 is detached from the mobile communication terminal at step 508. If it is determined that the detachable display window 210 is detached, the ear speaker is activated to generate the low-power voice at step 510. Otherwise, the high-power speaker is activated to generate the high-power voice at step 514.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A mobile communication terminal for displaying an image, comprising:
   a display window detachable from a main body, for performing short-range wireless communication with the main body; and
   the main body for performing the short-range wireless communication with the display window, the main body comprising a programmed controller responsive to detachment of the display window from the main body for operating an ear speaker provided to the main body when it is determined that the display window is detached from the mobile communication terminal, and for operating a high-power speaker when it is determined that the display window is attached to the mobile communication terminal,
   wherein the detachable display window has a liquid crystal display (LCD) wireless communicating unit for providing wireless communication based on a short-range wireless communication protocol, and for displaying the image.

2. A mobile communication terminal for displaying an image, comprising:
   a display window detachable from a main body, for performing short-range wireless communication with the main body; and
   the main body for performing the short-range wireless communication with the display window,
   wherein the detachable display window has a liquid crystal display (LCD) wireless communicating unit for providing wireless communication based on a short-range wireless communication protocol, and for displaying the image, wherein the display window has a camera module.

3. A method for controlling a mobile communication terminal comprising a display window, the method comprising the steps of:
   upon receiving a video call packet, displaying a call request; and
   entering a video call mode using short-range wireless communication when it is detected that the display window is detached, and entering a video call mode when a send key is pressed.

4. The method of claim 3, wherein the display window comprises a liquid crystal display (LCD).

5. The method of claim 3, wherein the display window has a camera module.

6. A method for controlling a mobile communication terminal comprising a detachable display window, the method comprising the steps of:
   entering a call mode when a voice call packet is received from a base station, and determining whether or not the display window is detached when a video call packet is received from the base station; and
   operating an ear speaker provided to a main body to perform the video call when it is determined that the display window is detached from the mobile communication terminal, and operating a high-power speaker to perform the video call when it is determined that the display window is attached to the mobile communication terminal.

7. The method of claim 6, wherein the display window comprises a liquid crystal display (LCD).

8. The method of claim 6, wherein the display window has a camera module.

9. A method for controlling a mobile communication terminal comprising a display window, the method comprising the steps of:
   entering a call mode when a voice call packet is received from a base station, and determining whether there is a separate wireless liquid crystal display for performing short-range wireless communication with a main body when a video call packet is received from the base station;
   transmitting image data to a corresponding wireless liquid crystal display to perform a video call when the separate wireless liquid crystal display exists, and determining whether or not the display window is detached when the separate wireless liquid crystal display does not exist; and
   operating an ear speaker provided to a main body to perform the video call when it is determined that the display window is detached from the mobile communication terminal, and operating a high-power speaker to perform the video call when it is determined that the display window is attached to the mobile communication terminal.

10. The method of claim 9, wherein the display window has a camera module.

* * * * *